United States Patent [19]
Weaver

[11] Patent Number: 5,980,807
[45] Date of Patent: Nov. 9, 1999

[54] APPARATUS AND METHODS FOR REDUCING PLASTICS PIPES

[75] Inventor: Raymond Weaver, Wimborne, United Kingdom

[73] Assignee: Subterra Limited, Dorset, United Kingdom

[21] Appl. No.: 08/952,630

[22] PCT Filed: May 21, 1996

[86] PCT No.: PCT/GB96/01220

§ 371 Date: Nov. 19, 1997

§ 102(e) Date: Nov. 19, 1997

[87] PCT Pub. No.: WO96/37725

PCT Pub. Date: Nov. 28, 1996

[30] Foreign Application Priority Data

May 22, 1995 [GB] United Kingdom .................... 9510279

[51] Int. Cl.⁶ ............................ B29C 53/20; B29C 63/34
[52] U.S. Cl. ........................... 264/280; 264/269; 425/392
[58] Field of Search .................................. 264/269, 280, 264/516; 425/392, 394

[56] References Cited

U.S. PATENT DOCUMENTS

| 4,504,171 | 3/1985 | Florence, Jr. . | |
|---|---|---|---|
| 5,114,634 | 5/1992 | McMillan et al. | 264/269 |
| 5,340,524 | 8/1994 | McMillan et al. . | |
| 5,626,801 | 5/1997 | McMillan et al. | 264/269 |

FOREIGN PATENT DOCUMENTS

| 0 266 951 | 5/1988 | European Pat. Off. . |
|---|---|---|
| 1 570 807 | 6/1990 | U.S.S.R. . |
| WO A 92 15818 | 9/1992 | WIPO . |

*Primary Examiner*—Mathieu D. Vargot
*Attorney, Agent, or Firm*—Kinney & Lange, P.A.

[57] ABSTRACT

Apparatus and method for producing reduction in maximum width in plastics lining pipes includes at least one pair of reducing rolls through which the lining pipe is forced from upstream thereof. The rolls are disposed and configured to present a roll throat of effective ovality, defined by the percentage difference between the maximum dimension normal to the axes of rotation and the maximum dimension parallel to the axes of rotation, in the range of 5% and 30%.

19 Claims, 1 Drawing Sheet

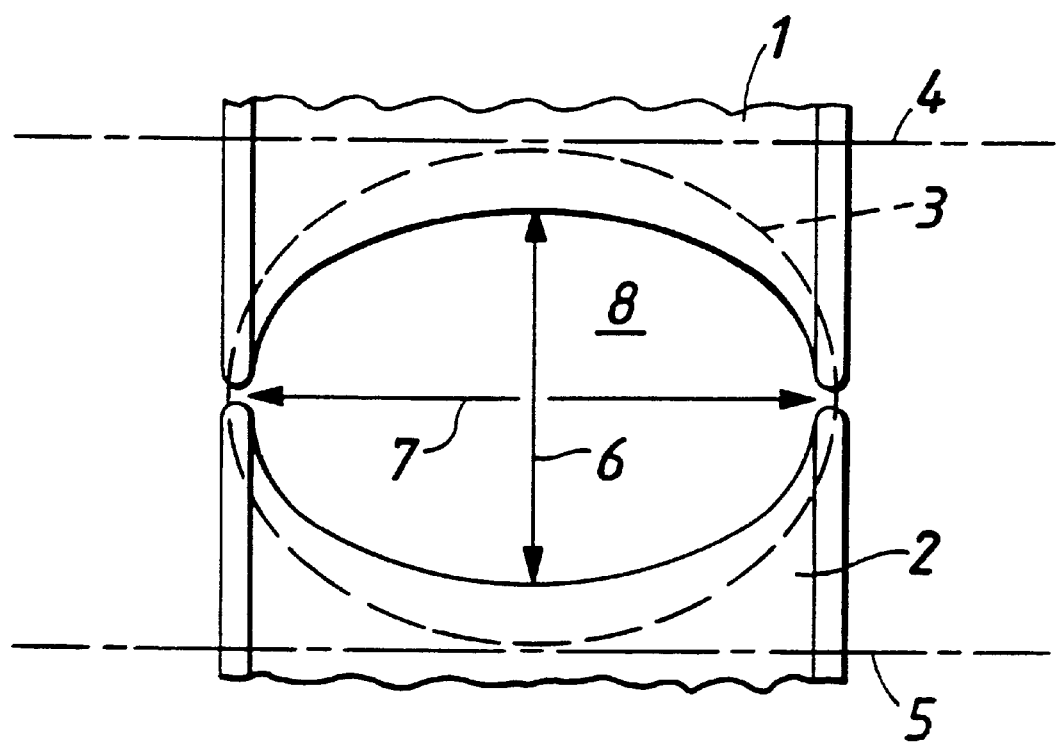

APPARATUS AND METHODS FOR REDUCING PLASTICS PIPES

BACKGROUND OF THE INVENTION

This invention relates to apparatus and methods for reducing the width of plastics pipes, and more particularly to such apparatus and methods for reducing temporarily the width of plastics liner pipes for use in relining old or damaged fluid transport pipelines, such as mains water or drainage water pipelines.

The provision of such plastics liner pipes in these circumstances is a known area of technology utilising a variety of ways of fitting the liner pipes into the existing pipework system. The present invention relates to a technique, hereinafter referred to as the "roll-down" technique, in which a liner pipe, either in a continuous length as formed on extrusion, or as separate plastics pipes butt-welded together to a continuous length, and having an appropriate width for eventually fitting tightly within the pipeline to be relined is pushed through a sequence of roller sets to reduce the width of the liner temporarily so that it may then be fed into and through the pipeline system to be relined and subsequently allowed to expand, possibly with the help of pressurised fluids and/or heat, to its original width so as to fit tightly within the original pipework.

In such a roll down system, the pipe liner is physically driven from the upstream end through a succession of curved profile rolls each of which, in end view, is somewhat half-circular in configuration, the basic principle being that the pipe liner, of larger diameter than a first pair of opposed rolls having a somewhat circular roll throat in front view, is, subject to the thrusting force from upstream, caused to reduce in diameter on passage through that set of rolls, and then on through a second pair of rolls, usually rotatable at right angles to the first set of rolls, and possibly even a third pair of rolls, again having their axes of rotation at right angles to the previous set of rolls.

It has been found in such an arrangement that a straightforward reduction in diameter of the liner pipe in passing through a set of such rolls, if the rolls exert a truly circular radial force on the incoming pipes, and therefore result in the output of a truly circular reduced pipe from the first rolls, can result in collapse of the pipe liner during passage therethrough inwardly into a configuration generally known as a "heart collapse" (from its collapsed configuration of a somewhat heart-shaped nature). When this occurs, there is quite clearly a failure of the rolling technique.

SUMMARY OF THE INVENTION

It is an object of the present invention to overcome or at least to significantly reduce this problem.

According to one aspect of the present invention there is provided apparatus for producing reduction in width in plastics lining pipes including at least one pair of reducing rolls through which in use the liner pipe is forced from the upstream thereof, the rolls being disposed and configured to present a roll throat of effective ovality having a percentage of the difference between the maximum dimension normal to the axes of rotation and the maximum dimension parallel to the axes of rotation toward the last mentioned dimension in the range of 5% and 30%.

In accordance with another aspect of the present invention there is provided a method for reducing in width plastics liner pipes for inserting into pipework comprising the steps of forcing the pipe from upstream thereof through at least one pair of reducing rolls, being disposed and configured to present a roll throat of effective ovality having a percentage of the difference between the maximum dimension normal to the axes of rotation and the maximum dimension parallel to the axes of rotation toward the last mentioned dimension in the range of 5% and 30%.

The or each set of rolls may be freely rotatable.

With relatively small plastics liner pipes, which may preferably be made of polyethylene, of initial diameter of the order of 4 inches (104 mm diameter), two roll sets may be provided in succession with their successive axes of rotation at right angles, the rolls in each set may be so disposed and configured as to present a reducing ovality at the roll throats of successive roll sets through the set. Thus where two roll sets are provided, the first may be of the order of 13% to 18% for example and the second may for example be of the order of 5% to 10%.

Again with initial diameter pipe of approximately 12 inches diameter (315 mm) the three sets of rolls each having axes of rotation at right angles to the previous set may be provided, which may present a roll throat ovality of between 22% and 25% for the first set of rolls, 14% and 18% for the second set of rolls, and 5% and 8% for the third set of rolls.

Again with polyethylene pipe liners having an initial 18 inch diameter (450 mm) a three set draw down roll system may be provided in which the first set provides an ovality between 25% and 30%, the second set presents an ovality of between 11% and 15%, and the third set provides an ovality of between 6% and 10%.

The overall width reduction produced by the above mentioned roll sets will be of the order of 10% of the original pipe liner diameter.

The Applicants are aware that in the roll reduction production of steel tube it has been proposed to apply slight ovality to the pipe undergoing reduction as it passes through the multiple roll sets in a sequence of such sets of rolls. However, there are very significant differences in the production of steel tube, in the operating speeds, and temperatures, as well as very different physical characteristics of the materials of the tubes and pipes concerned. Indeed, the technologies are not all analogous. We have found that whereas the provided ovality in steel pipe roll construction is of a minimal nature of the order of ½% as hereinabove defined, a surprisingly totally different order of ovality, with the highly desirable effects of strengthening the pipes against "heart collapse" with plastics liner pipes can be achieved in accordance with the invention herein defined.

BRIEF DESCRIPTION OF THE DRAWINGS

In order that the invention may be more readily understood one embodiment thereof will now be described by way of example with reference to the drawing which is a schematic front view from downstream of a pair of rolls 1, 2 through which a plastics liner pipe 3 is forced from the upstream end.

DESCRIPTION OF THE INVENTION

The rolls 1, 2 are freely rotatable about axes 4, 5 and are profiled to present a roll throat 8 of ovality defined by the percentage difference between the maximum dimension 6 normal to the axes 4, 5 and the maximum dimension 7 parallel to the axes 4, 5.

We have found that when roll reducing an initially 104 mm diameter liner pipe to a temporarily reduced liner pipe of general width of 89 mm (3½inches ) a double roll set having axes at right angles to each other and presenting successively a 16% ovality and a 7% ovality satisfactorily reduces the pipe width without any risk of collapse of the pipe liner in the manner herein described.

Similarly with a 315 mm initial diameter pipe a triple roll set presenting a 23% ovality, a 16% ovality, and a 6.7% ovality successively, without risk of collapse of the pipe, produces a temporarily reduced pipe liner of general width of 290 mm.

Yet again, with a 450 mm diameter polyethylene pipe, a triple roll set presenting successively a 27.5% ovality, a 13.8% ovality, and an 8% ovality produce a temporarily reduced pipe liner for insertion into the pipeline of general width of 423 mm.

It is to be understood that the foregoing is merely exemplary of apparatus for and methods of reducing the width of liner pipes in accordance with the invention and that modifications can readily be made thereto without departing from the true scope of the invention.

I claim:

1. Apparatus for producing a reduction in width in plastics liner pipes including at least one pair of reducing rolls through which in use the liner pipe is forced from the upstream thereof, the rolls being disposed and configured to present a roll throat of effective ovality wherein the percentage of the difference between the maximum dimension normal to the axes of rotation and the maximum dimension parallel to the axes of rotation towards the last dimension is in the range of 5% and 30%.

2. Apparatus as claimed in claim 1 wherein the or each set of rolls is freely rotatable.

3. Apparatus as claimed in claim 1 wherein two roll sets are provided in succession with their successive axes of rotation at right angles, the rolls in each set being so disposed and configured as to present a reducing ovality at the roll throats of successive roll sets.

4. Apparatus as claimed in claim 3 wherein, of the two roll sets provided, the effective ovality of the first is of the order of 13% to 18%, and of the second is of the order of 5% to 10%.

5. Apparatus as claimed in claim 1 including three sets of rolls each having axes of rotation at right angles to the previous set, presenting an effective roll throat ovality of between 22% and 25% for the first set of rolls, 14% and 18% for the second set of rolls, and 5% to 8% for the third set of rolls.

6. Apparatus, as claimed in claim 1 including a three set draw down roll system each set having axes of rotation at right angles to the previous set, wherein the first set provides an effective roll throat ovality of between 25% and 30%, the second set of between 11% and 15%, and the third set of between 6% and 10%.

7. Apparatus as claimed in claim 6 wherein the overall width reduction produced by the above-mentioned roll sets is of the order of 10% of the original pipe liner diameter.

8. A method for reducing a maximum width of plastic liner pipes for inserting into pipe work comprising the steps of forcing the pipe from upstream thereof through one pair of reducing rolls disposed and configured to present a roll throat of effective ovality having a maximum dimension less than the maximum original width of the liner pipe wherein the percentage of the difference between the maximum dimension normal to the axes of the rotation and the maximum dimension parallel to the axes of rotation toward the last mentioned dimension is in the range of 5% and 30%.

9. Apparatus of claim 1 wherein the pair of reducing rolls contact substantially all of the plastic liner pipe circumference.

10. Apparatus for producing a reduction in maximum width in plastic liner pipes including a pair of reducing rolls through which a liner pipe is forced from upstream thereof with the rolls being disposed and configured to present a roll throat having a maximum dimension normal to axes of rotation a percentage less than a maximum dimension parallel to the axes of rotation, the percentage defining an effective ovality, the effective ovality being in the range of 5% and 30%.

11. Apparatus of claim 10 wherein the pair of reducing rolls contact substantially all of the plastic lining pipe circumference.

12. Apparatus of claim 10 wherein the or each set of is freely rotatable.

13. Apparatus of claim 10 wherein two roll sets are provided in succession with their successive axes of rotation at right angles, the rolls in each set being disposed and configured as to present a reducing effective ovality at the roll throats of successive roll sets.

14. Apparatus of claim 10 wherein of the two roll sets provided the effective ovality of the first set is of the order of 13% to 18% and the second set is of the order of 5% to 10%.

15. Apparatus of claim 10 comprising three sets of rolls each having axes of rotation at right angles to a previous set, presenting a roll throat having an effective ovality of between 22% and 25% for the first set of rolls, 14% and 18% for the second set of rolls, and 5% and 8% for the third set of rolls.

16. Apparatus of claim 10 including a three set draw down roll system each set having axes of rotation at right angles to the previous set, wherein the first set provides a roll throat of effective ovality of between 25% and 30%, the second set between 11% and 15%, and the third set between 6% and 10%.

17. Apparatus of claim 15 wherein the maximum width produced by the above mentioned roll sets is of the order to 10% of the original liner pipe diameter.

18. The apparatus of claim 1, wherein the roll throat has a maximum dimension on the order of 3½ inches or larger.

19. The apparatus of claim 10, wherein the roll throat has a maximum dimension on the order of 3½ inches or larger.

* * * * *